(12) United States Patent
Delevski et al.

(10) Patent No.: US 12,476,452 B2
(45) Date of Patent: Nov. 18, 2025

(54) MULTI-VOLTAGE CAPACITIVE FILTER PROTECTION CIRCUIT

(71) Applicant: C.E. Niehoff & Co., Evanston, IL (US)

(72) Inventors: Dimitar Delevski, Northbrook, IL (US); Corey Buzzard, Skokie, IL (US); Svetoslav Pirev, Glenview, IL (US); Issam Jabaji, Glenview, IL (US)

(73) Assignee: C.E. Niehoff & Co., Evanston, IL (US)

( * ) Notice: Subject to any disclaimer, the term of this patent is extended or adjusted under 35 U.S.C. 154(b) by 143 days.

(21) Appl. No.: 18/196,692

(22) Filed: May 12, 2023

(65) Prior Publication Data
US 2024/0022064 A1    Jan. 18, 2024

Related U.S. Application Data

(60) Provisional application No. 63/389,264, filed on Jul. 14, 2022.

(51) Int. Cl.
*H02H 3/28* (2006.01)
*B60R 16/03* (2006.01)
*H02H 1/00* (2006.01)

(52) U.S. Cl.
CPC .............. *H02H 3/28* (2013.01); *B60R 16/03* (2013.01); *H02H 1/0007* (2013.01)

(58) Field of Classification Search
CPC ......... H02H 3/28; H02H 1/0007; B60R 16/03
See application file for complete search history.

(56) References Cited

U.S. PATENT DOCUMENTS

| | | | |
|---|---|---|---|
| 8,598,899 B2 * | 12/2013 | Hess | H02H 9/042 307/130 |
| 2003/0210014 A1 * | 11/2003 | Jabaji | H02J 7/007182 320/104 |
| 2018/0175605 A1 * | 6/2018 | Qi | H02H 7/263 |
| 2022/0271712 A1 * | 8/2022 | Gao | H02H 5/041 |

* cited by examiner

*Primary Examiner* — Scott Bauer
(74) *Attorney, Agent, or Firm* — Banner & Witcoff, Ltd.

(57) ABSTRACT

A protection circuit for a capacitive filter for a multi-voltage system includes a first capacitor electrically connected between a first connection point at a first electrical potential and a second connection point at a second electrical potential and a second capacitor electrically connected between the second connection point and a third connection point at a third electrical potential. The first electrical potential is greater than the second electrical potential and the third electrical potential is less than the second electrical potential. The third electrical potential may be electrical ground. A controller circuit monitors a voltage differential across the first capacitor and the second capacitor and, based on the voltage differential meeting a threshold condition, controls a switch to disconnect one or both of the first capacitor and the second capacitor.

20 Claims, 7 Drawing Sheets

Capacitive Filter

MULTI-VOLTAGE CAPACITIVE FILTER PROTECTION CIRCUIT

CROSS REFERENCE TO RELATED APPLICATIONS

This application claims priority to Patent Application No. 63/389,264 entitled "Multi-Voltage Capacitive Filter Protection Circuit" filed Jul. 14, 2022, which is incorporated by reference in its entirety.

BACKGROUND

Capacitors may be used as noise filters for a variety of circuits. In automotive applications, often relatively big (e.g., high capacitance) capacitors are used to filter an alternator's output to remove voltage spikes and voltage ripple. Such noise may be especially problematic during battery-less operation of the alternator when one or all the batteries in the system are disconnected, damaged, and/or in a state of charge (SOC) where the batteries can't perform their function of filtering the alternator's output power. Capacitive filters can be especially important in automotive applications where lithium (Li)-ion (or similar) batteries are connected to the alternator. Unlike lead acid batteries, Li-ion can disconnect from the system for protection based on problematic voltage, current and/or temperature conditions. In such situations, the added system capacitive filter performs the battery's role of filtering the alternator's output. In some multi-voltage applications, an alternator capable of producing multiple output voltages is connected to a battery pack (or packs) capable of providing multiple voltages. Generally, the filter capacitors are electrolytic type capacitors having a specific polarity. As such, these capacitors are very sensitive to a reverse bias connection and, therefore, can fail in a very short time thereby creating a thermal event risk for the capacitors and/or the system in general.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

This application relates generally to vehicle power systems and more particularly to circuits for protection of capacitive filters for alternator generator power systems.

A protection circuit for a capacitive filter for a multi-voltage system includes a first capacitor electrically connected between a first connection point at a first electrical potential and a second connection point at a second electrical potential and a second capacitor electrically connected between the second connection point and a third connection point at a third electrical potential. The first electrical potential is greater than the second electrical potential and the third electrical potential is less than the second electrical potential. The third electrical potential may be electrical ground. A controller circuit monitors a voltage differential across the first capacitor and the second capacitor and, based on the voltage differential meeting a threshold condition, controls a switch to disconnect one or both of the first capacitor and the second capacitor.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional, in which.

DETAILED DESCRIPTION

Aspects of the present disclosure are directed toward protection of a multiple voltage capacitive filter for automotive power systems.

In the following description of various example structures and methods in accordance with the invention, reference is made to the accompanying drawings, which form a part hereof, and in which are shown by way of illustration various fitness devices and systems using fitness devices in accordance with various embodiments of the invention. Additionally, it is to be understood that other specific arrangements of parts and structures may be utilized and structural and functional modifications may be made without departing from the scope of the invention.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements.

Figure 1:
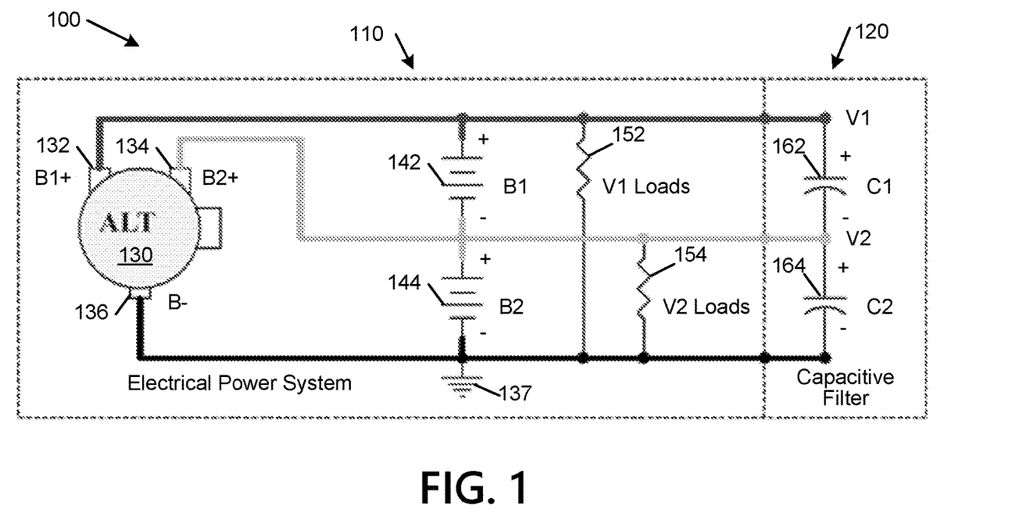
FIG. 1 shows a block diagram of an illustrative multiple voltage output generator-based power system according to aspects of the disclosure.

FIG. 1 shows an electrical power system 100, such as an electric power system 110 of a vehicle. In the illustrative electric power system 110, an alternator 130 may generate electrical power to support electrical power needs for the vehicle and associated and/or connected electrical equipment. In some cases, multiple voltage outputs (e.g., 2 or more) may be provided by the alternator. For example, in the illustrative case shown in FIG. 1, the alternator 130 outputs two different output voltages V1 and V2 where, for example, the output voltage V2 may be less than (e.g., one half, one fourth, etc.) of the output voltage V1. In the electrical power system 110, multiple batteries (e.g., battery 142, battery 144, etc.) may be connected in series or parallel. For example, an application may include multiple batteries (e.g., 3, 4, 5, or more) batteries connected in series. Additionally, these batteries may be used in vehicle power systems where the alternator can produce multiple (e.g., 2, 3, 4 or more) different output voltages. In such multiple voltage output systems, the loads (e.g., the V1 loads 152 and the V2 loads 154) can be connected to different middle points between the batteries.

Figure 12:
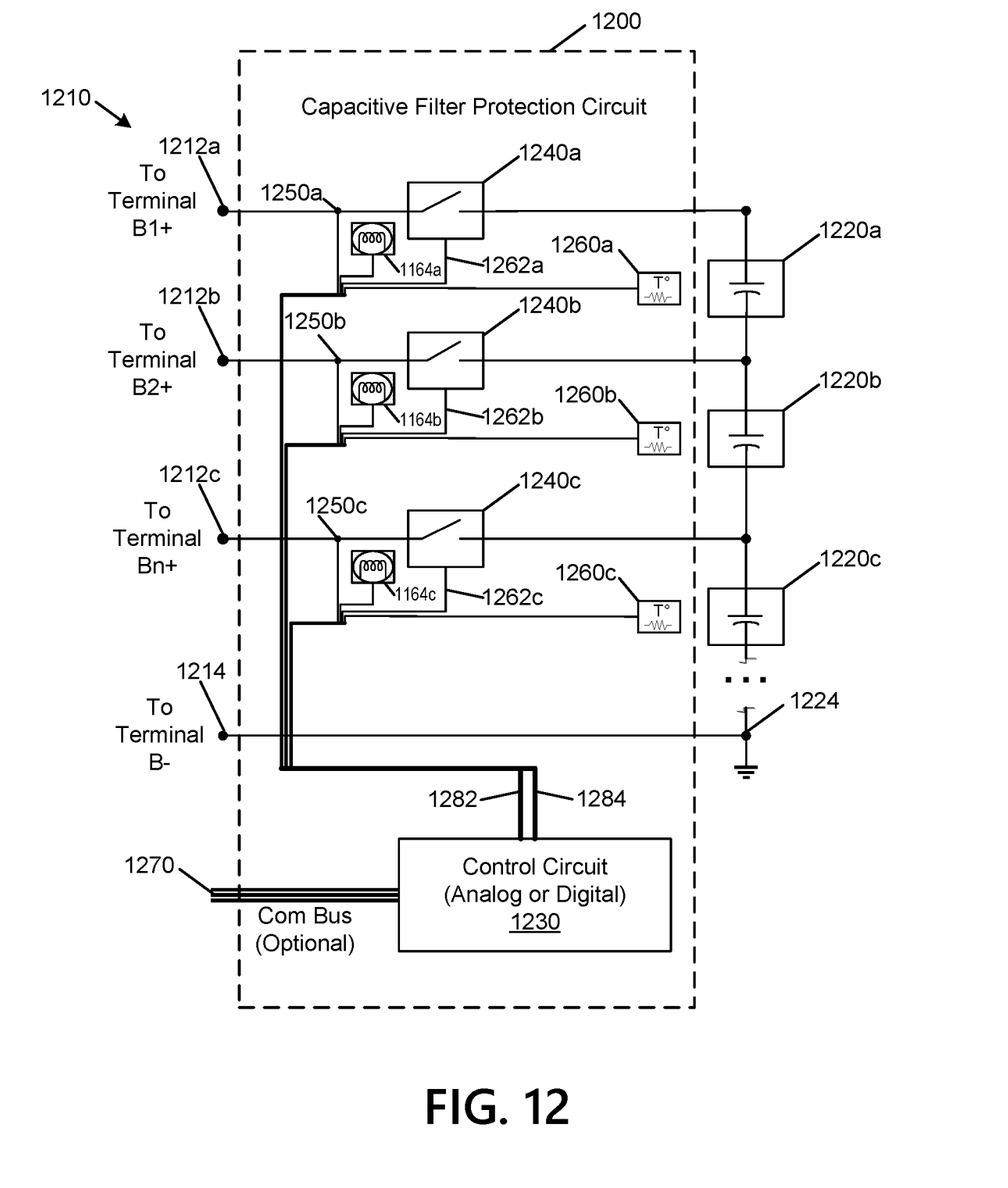
FIG. 12 shows an illustrative multi-voltage capacitive filter protection circuit according to aspects of the disclosure.

In general, the principle of operation of a multi-voltage capacitive filter protection circuit is the same for systems with two voltage outputs and systems with three or more different voltages. For simplicity, the examples discussed in this disclosure reference a dual voltage system where V2 is half of V1, but use of the multi-voltage capacitive filter protection circuit is not limited to this configuration, as shown in FIG. 12.

In FIG. 1, a multiple-voltage capacitive filter 120 may include a capacitor connected in parallel with the battery and load at each voltage level. For example, the capacitor 162 (C1) may be connected between a first voltage output 132 (B1+) of the alternator and a second voltage output 134 (B2+), where the voltage level V1 output by the first voltage output 132 of the alternator 130 is greater than the voltage level V2 output by the second voltage output 134. The capacitor 164 (C2) may be connected between the second voltage output 134 (B2+) and electrical ground 137 (e.g., a connection 136 (B−) of the alternator 130 may be connected to an electrical ground of the vehicle or other system).

Figure 2:
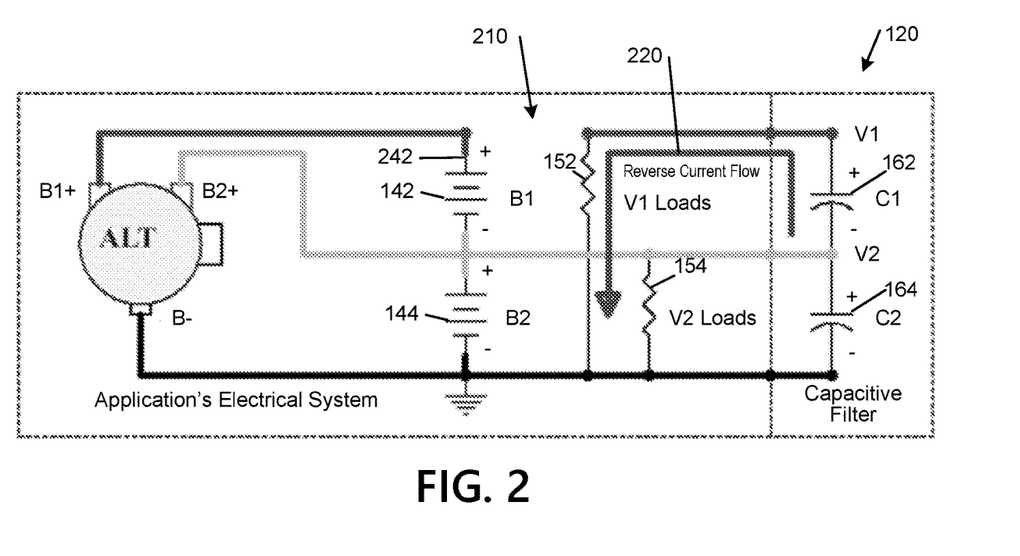
FIGS. 2-6 show illustrative failure modes that may be experienced by an illustrative multiple voltage output generator-based power system.

In some cases, the electrical system of a vehicle, or other application, may include a component that may be subject to a failure. For example, the system capacitive filter 120 including capacitors 162 and 164 may be used in the multi-voltage application as shown in FIG. 1. A failure may occur causing a connection between the electrical loads 152 and 154 and one of the batteries 142 or 144 to be lost. As a result, the electrical loads connected to the lost battery forces the corresponding capacitor of the capacitive filter into a reverse bias state in reference to the remaining battery in the system. In automotive or other vehicular applications, high electrical loads (e.g. a low resistance load that may be <1 ohm) cause a high reverse current to flow through the capacitators. Such a failure mode is shown in FIG. 2.

Figure 3:
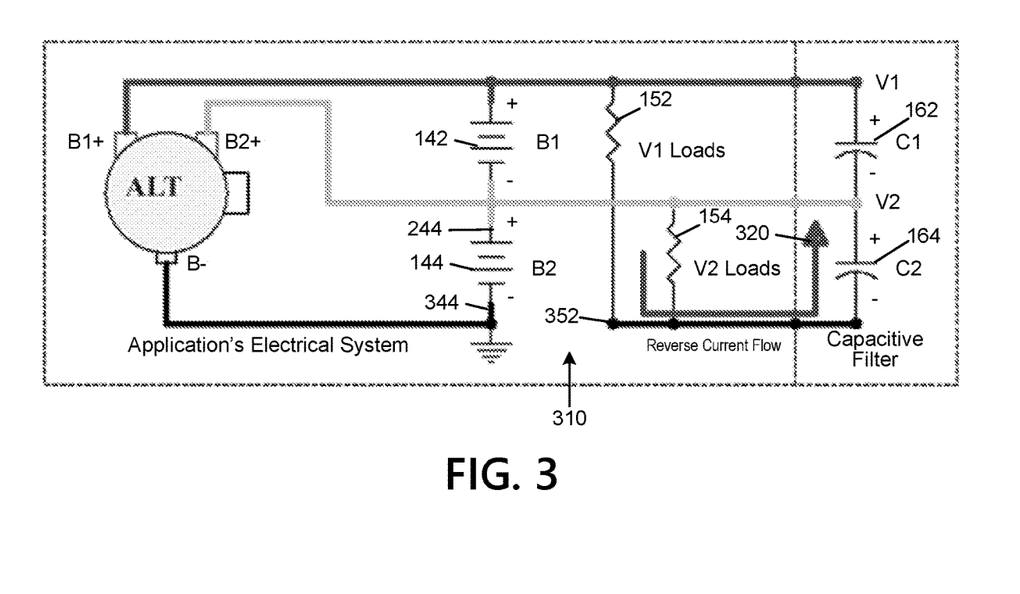

Here, a failed connection 210 between the V1 loads 152 (e.g., the electrical component(s) receiving electrical power at the first voltage level V1) and the B+terminal (e.g., terminal 242) on battery 142 (B1) is lost, while loads 152 remain connected to the capacitive filter 120. As a result, the filter capacitor 162 (C1) is connected in reverse to the battery 144 (B2) through the low resistance (e.g., <1 ohm) V1 loads 152. This situation ultimately causes failure of the C1 capacitor 162 due to the reverse current flow 220. FIG. 3 shows another similar failure mode. Here, the failed connection 310 between the terminal 344 (B) on the battery 144 (B2) and a terminal 352, the V2 loads 154 and the filter 120 is shown as being lost. As a result the V1 loads 152 connect the filter capacitor 164 (C2) in reverse to the battery 142 (B1) and the capacitor 164 will fail because of the reverse current flow 320.

Figure 4:
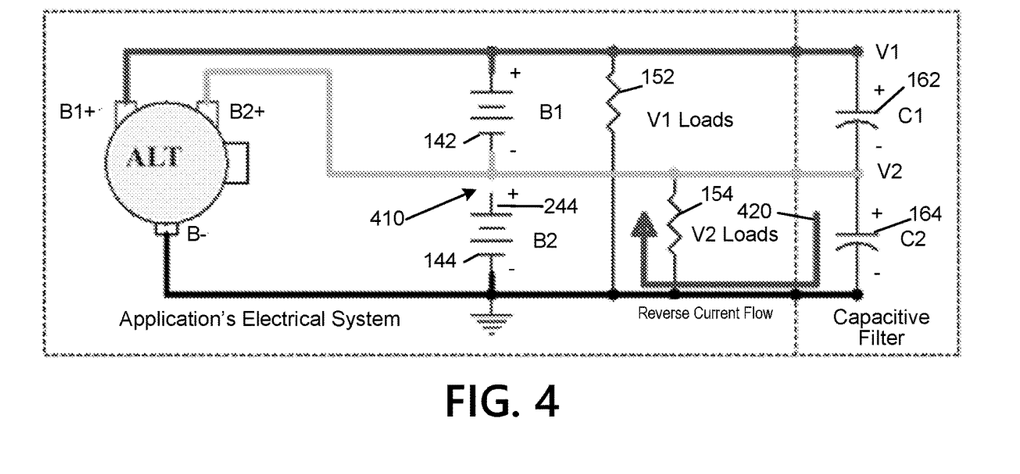

Another failure mode, that may occur when the alternator (e.g., alternator 130) is not producing electrical power, is shown in FIG. 4. Here, a connection failure 410 between the B+terminal 244 on battery 144 and the middle point between the two batteries 142 and 144 is shown. As a result the V1 loads 152 connect the filter capacitor 164 (C2) in reverse to the battery 142 (B1) and the capacitor 164 (C2) will fail because of the resulting reverse current flow 420. In cases where the alternator continues to produce electrical power when the connection failure 410 occurs, the alternator may conceal or otherwise obscure the battery connection failure 410 because the alternator would continue to run as if in a "battery-less" mode.

Figure 5:
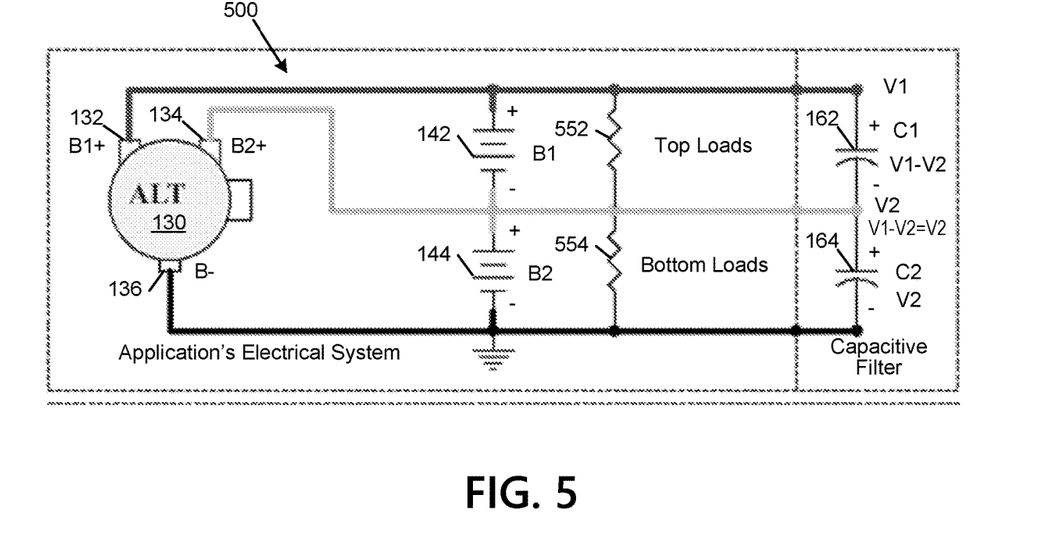

Another possible application of the system 500 is shown in FIG. 5, where two loads, the top loads 552 and the bottom loads 554, are connected in series, but are parallel with the batteries 142 and 144 and the filter capacitors 162 and 164, respectively. When the batteries 142 and 144 are connected in the system 500 in such a manner, the voltage across the two loads and the two filter capacitors are the same or nearly the same dependent on the batteries condition (e.g., the state of charge (SOC) of each battery). As such, the voltage drop across the top capacitor 162 is V1-V2 voltage is calculated to be the same or almost the same as the V2 voltage across the bottom capacitor 164. In actual applications, the capacitors may be sized such that the voltage rating of each capacitor may be above, but very close to, each individual battery voltage V1 and V2. For example, if the batteries are 12V then each capacitor may be rated at 16V or 25V. However, a higher-voltage capacitor rating may correspond to an increased capacitor size. But an interior compartment of a vehicle may be dimensionally limited and may not have available physical space to install larger size capacitors. As such, compromises are made between the capacitor voltage rating and the value of the capacitor's capacitance (because lower capacitance corresponds to smaller capacitor dimensions). The lower capacitance values will negatively impact the filter performance. A potential failure mode for the application of the system 500 is shown in FIG. 6.

Figure 6:
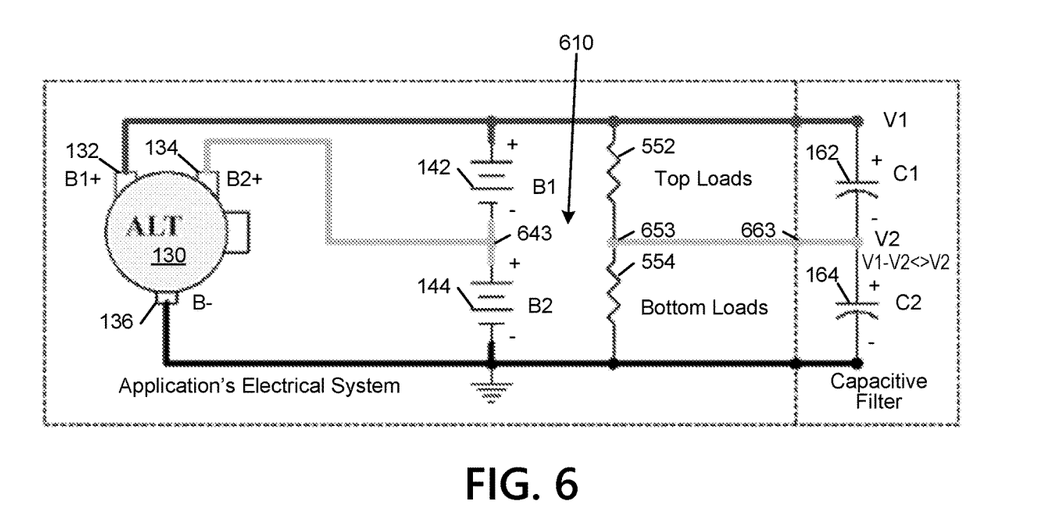

In FIG. 6, if a connection failure 610 exists between the series connected batteries middle point 643 and the middle point 653 of the loads 552 and 554 and the filter middle point 663, the filter capacitors 162 and 164 will be connected only to the V1 voltage and ground. As such, the voltage across each capacitor 162 and 164 will be defined by the resistive ratio of the loads 552 and 554. For example if each battery 142 and 144 is 12V then V1 will be equal to 24V. If, for example, the resistance ratio of the loads 552 and 554 is 1:9 (e.g., top loads 552 are approximately 1 ohm and the bottom loads 554 are approximately 9 ohms) then the voltage drop across the top capacitor 162 (C1) will be 2.4V and the voltage drop across the bottom capacitor 164 (C2) will be 21.6V. If the bottom capacitor 164 is rated at 16V, the voltage across it will be greater than its rating (e.g., 5.6V above its rating). This over-voltage condition could lead to a failure of the capacitor 164. Additionally, in an operational mode when the alternator 130 is operational and producing output, the alternator 130 may charge a 24V battery system with a higher voltage output (e.g., up to 30V). This charge voltage may be generated on one or more factors affecting system operation, such as being based on the batteries' temperature when the ambient temperature is below room temperature. In such cases, the capacitor 162 will see 3V and the capacitor 164 will see 27V. As such, even if the capacitors 162 and 164 are rated for 25V, the capacitor 164 will see 2V above its rating. The same example is valid if the ratio between the top loads 552 and bottom load 554 is opposite −9:1. In that case, the capacitor 162 will be exposed to potentially higher voltage than its rating voltage.

Figure 7:
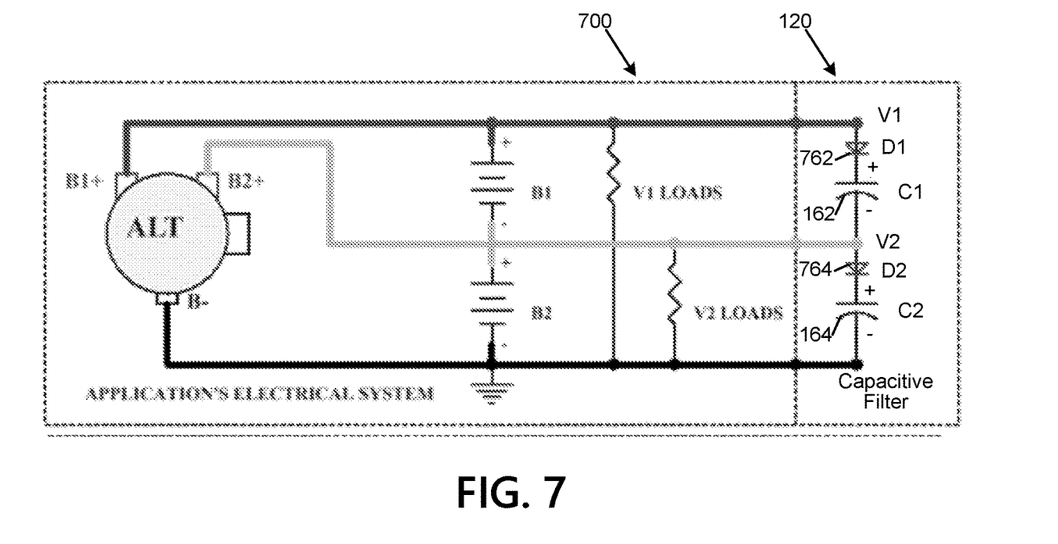
FIGS. 7-9 show problematic multi-voltage capacitive filter protection configurations.
Figure 8:
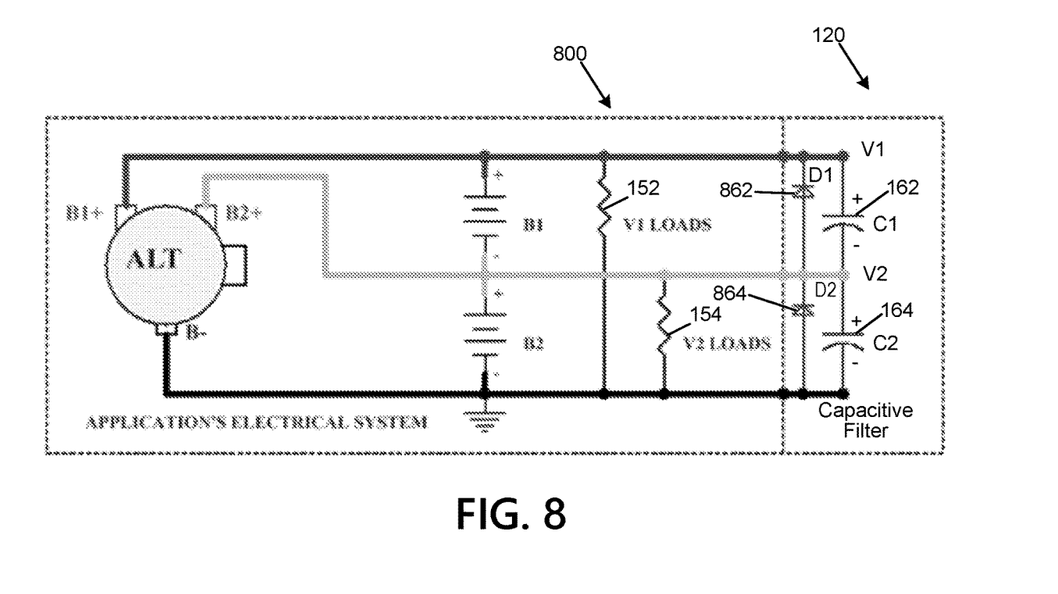
Figure 9:
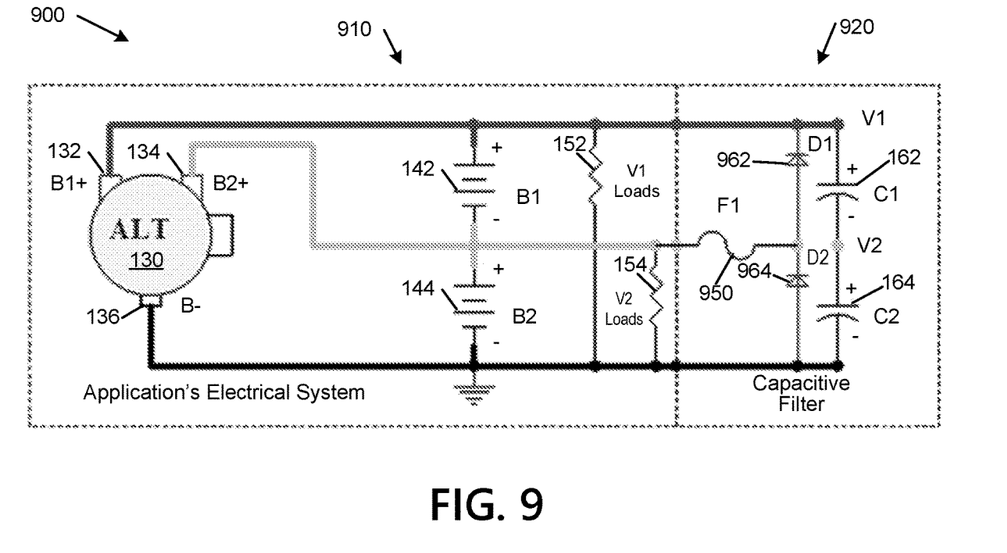

FIGS. 7-9 show possible, yet impractical, solutions that may be used in an attempt to protect the capacitors 162 and 164 in the filter circuit 120. For example, a solution may protect the capacitors 162 and 164 with protection diodes 762 and 764 in series with the capacitors 162 and 164 or with diodes 862 and 864 in reverse and parallel with the capacitors 162 and 164, and/or with fuses (e.g., fuse 950) and/or circuit breakers in series with the capacitors. While such protection circuits may work in certain situations, the negatives for the above-mentioned solutions may include situations where the capacitive filters used in automotive applications can be subject to large currents (e.g., hundreds of amps), especially in battery-less alternator operation. In such cases, if protection diodes 762 and 764 in series with the capacitors 162 and 164 are used as shown in FIG. 7, the protection diodes 762 and 764 will be subject to those same high currents. As a result, the diodes 762 and 764 need to dissipate a substantial amount of power (e.g., 1V*100 amps=100 W), which is not practical for most situations.

If diodes 862 and 864 in reverse parallel connection to the capacitors 162 and 164 are used to limit the reverse voltage across the capacitors 162 and 164, as shown in FIG. 8, the reverse-connected diodes 862 and 864 will experience high currents as well. These high currents are limited only by the connected loads 152 and 154, which as previously discussed, can be very small (e.g., below one ohm), thus, leading to high current flow. If fuses and/or circuit breakers, such as fuse 950, are used, as shown on FIG. 9 and with or without reverse diodes 962 and 964, the fuses and/or circuit breakers will need to be replaceable (e.g., fuses) or resettable (e.g., circuit breakers). Such configurations make operation more problematic because the filter cannot work without outside intervention, even if the lost connection is restored.

Figure 10:
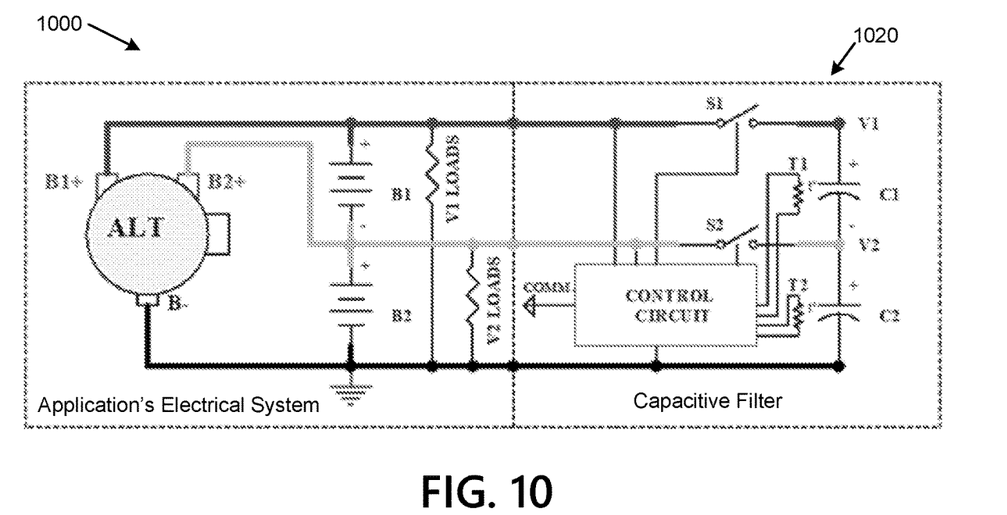
FIG. 10 shows an illustrative multi-voltage capacitive filter protection circuit according to aspects of the disclosure.

FIG. 10 shows a better solution to the failure modes discussed above with respect to FIGS. 2-6. For example, FIG. 10 shows use of a special control circuit for the capacitive filter 120 including low resistance switches (e.g., MOSFET transistors, relays or others) combined with a control circuit that can monitor voltage, current, temperature and/or other important filter and application parameters. Based on the monitored and/or calculated parameters the control circuit controls operation of the low resistance switches to act as a protective switch for the filter capacitors.

Figure 11:
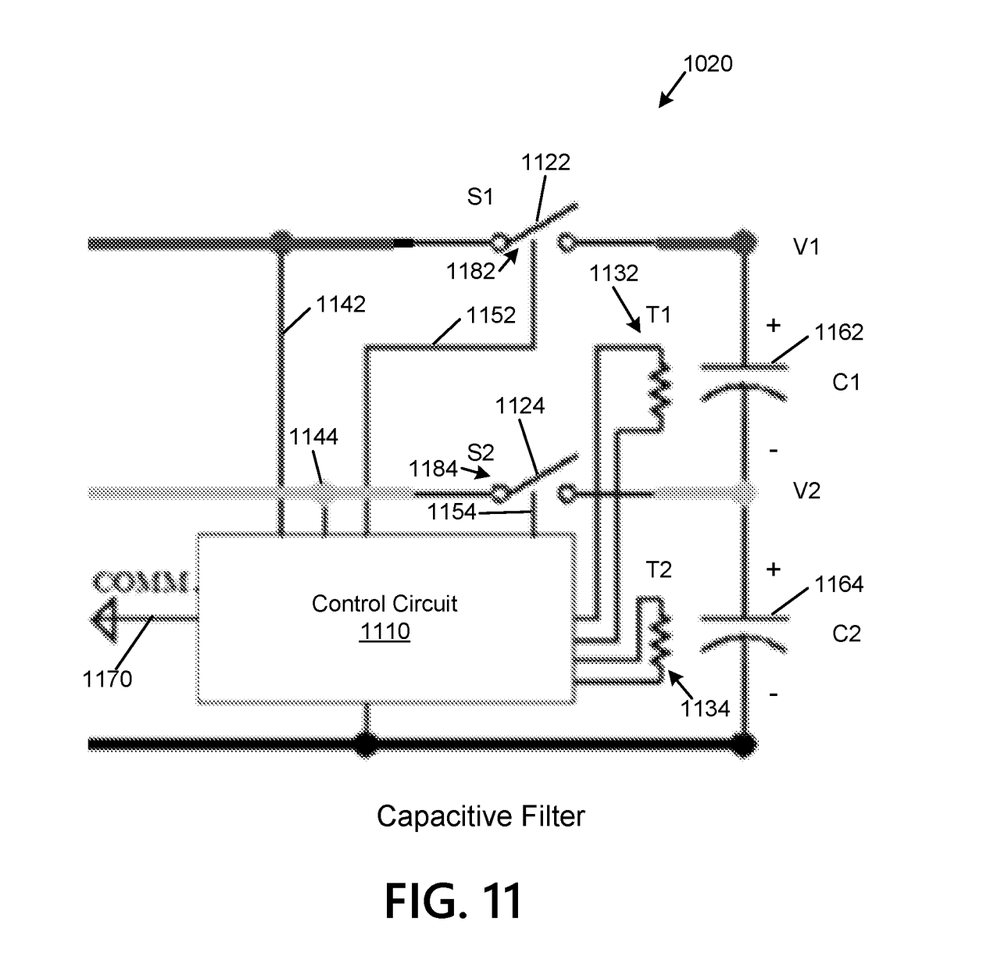
FIG. 11 shows an illustrative multi-voltage capacitive filter protection circuit according to aspects of the disclosure.

FIG. 11 shows an illustrative view of the control circuit for the capacitive filter according to aspects of this disclosure. For example, the control circuit 1110 may be a digital control circuit (e.g., a microcontroller), a combination of analog components, or a combination of a digital control circuit and analog components. The control circuit 1110 may monitor the output voltages of the alternator 130 (e.g., V1, V2, etc.) with respect to both ground and the other voltage (s), such as at 1142 and 1144, such as via a digital input of a microcontroller. If an error condition is present, such as if one or more connections are missing, if the ratio between the voltages is greater than the predefined ratio, or if the voltage is greater than the capacitor voltage rating, the control circuit 1110 will activate one or more of the protective switches 1182 and 1184 to disconnect the filter capacitors 1162 and 1164 from the application circuit to prevent capacitor failure. In some cases, the control circuit 1110 may monitor the current through the capacitors 1162 and 1164, such as via a current sensing circuit, and may disconnect one or both of the capacitors 1162 and/or 1164 if the current exceeds their rating. In some cases, the control circuit 1110 may monitor the capacitor's temperature via one or more temperature sensors 1132 and 1134. Based on the monitored temperature, the control circuit 1110 may disconnect one or both of the capacitors 1162 and/or 1164 if the temperature exceeds their rating. In some cases, the control circuit 1110 may measure the polarity of the batteries and may disconnect the capacitors 1162 and 1164 in case of a reverse polarity condition of one or all the batteries.

Based on the specific application, all or any combinations of the above features can be implemented. For example—only the S2 switch 1184 may be used in combination with only the voltage monitoring feature because the S2 switch 1184 will protect both capacitors 1162 and 1164 in most practical cases. Additionally, the protection circuit 1020 can be implemented for any number and combinations of voltages output by an alternator 130 or otherwise produced in a multi-voltage application, as shown in FIG. 12. In some cases, the control circuit 1110, or portions of the control circuit, may be a simple analog circuit. In some cases, the control circuit, or portions of the control circuit, may be a complex digital circuit with a microprocessor running specialized software which may (or may not) also communicate with external devices over one or more communication interfaces (e.g., communication interface 1170) such as but not limited to CAN bus, RS-232, RS-485, etc. to broadcast information about the filter condition and electrical parameters as well as to receive commands for setting the protection circuit parameters and operation. In some cases, an analog circuit may provide feedback to the external controller via one or more inputs of the external controller. For example, an external controller (e.g., a vehicle power system controller) may monitor one or more signals associated with operation of the multi-voltage electrical system. In certain conditions, the external controller may identify that a certain parameter (e.g., a temperature) has exceeded a defined threshold and may communicate a command to the control circuit 1110 to open one or more of the 51 switch 1182 and the S2 switch 1184 to disconnect at least a portion of the capacitors 1162 and 1164 of the filter.

FIG. 12 shows an illustrative capacitive filter protection circuit 1200 according to aspects of this disclosure. Here, the capacitive filter protection circuit may be configured to interface to a plurality of voltage connection points of an alternator or generator-based system 1210. For example, the capacitive filter protection circuit 1200 may include a plurality of voltage input connection points (e.g., connections 1212a, 1212b, 1212c, etc.) and a common reference connection point (e.g., connection 1214) to connect, for example, to an alternator-based vehicular electrical system. Additionally, the capacitive filter protection circuit may include, or be connected to, a plurality of capacitors (e.g., capacitors 1220a, 1220b, and 1220c) where each capacitor is associated with the plurality of voltage inputs as part of the capacitive filter which may also be connected to electrical ground 1224. As discussed above, each voltage level may be connected to a controlled switch (e.g., switch 1240a, switch 1240b, switch 1240c, etc.) capable of disconnecting an associated filter capacitor 1220a, 1220b, and 1220c. Each switch 1240a, 1240b, and 1240c may be activated via a control signal connection 1262a, 1262b, and 1262c provided by the control circuit 1230 via one or more outputs 1284.

The control circuit 1230 may generate the control signal based on an analysis of conditions of the capacitive filter, such as voltage levels, current levels, temperature, and the like. For example, the control circuit 1230 may include a plurality of inputs 1282 that may be configured to receive voltage signals (e.g., via a voltage sense input 1250a, 1250b, and 1250c), current signals (e.g., via a current sensor 1164a, 1164b, 1164c) and/or temperature signals (e.g., from a temperature sensor 1260a, 1260b, and 1260c). In some cases, the control circuit may share information with an external controller and/or receive information from the external controller network, via a communication bus 1270. For example, the control circuit 1230 may communicate voltage information, current information and/or temperature information corresponding to the capacitive filter operation to the external controller and may receive one or more commands to manipulate or otherwise activate and/or deactivate a switch (e.g., enable, energize, open, close, etc.) based on the analysis of the communicated voltage, current and/or temperature information. In some cases, the switch may include a combination of elements controlled to perform as a switch and/or a switch and a switch protection circuit. The control circuit 1230 may operate to disconnect a capacitor during conditions that may damage the component and may re-connect the capacitor when conditions improve.

While this disclosure describes in detail in terms of specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. A protection circuit comprising:
a first capacitor connected parallel to a first battery and between a first connection point and a second connection point, wherein the first connection point is associated with a first voltage level output of an alternator and the second connection point is associated with a second voltage level output of the alternator, wherein the first voltage level is different than the second voltage level;
a second capacitor connected parallel to a second battery and between the second connection point and a third connection point, wherein the third connection point is associated with a third voltage level;
a first switch; and
a controller circuit configured to activate the first switch to disconnect one or both of the first capacitor and the second capacitor based on a ratio between the first voltage level and the second voltage level being greater than a predefined ratio.

2. The protection circuit of claim 1, wherein the third voltage level corresponds to electrical ground.

3. The protection circuit of claim 1, wherein the controller is further configured to disconnect one or both of the first capacitor and the second capacitor based on a current level associated with one of the first capacitor or the second capacitor.

4. The protection circuit of claim 1, wherein the controller is further configured to disconnect one or both of the first capacitor and the second capacitor based on a comparison of a first capacitor temperature of the first capacitor to a first capacitor temperature rating or a second capacitor temperature of the second capacitor to a second capacitor temperature rating.

5. The protection circuit of claim 1, wherein the controller comprises an analog circuit.

6. The protection circuit of claim 1, wherein the controller comprises a microcontroller.

7. The protection circuit of claim 1, further comprising a communication interface, wherein the controller receives a command via the communication interface from an external device to disconnect one or both of the first capacitor and the second capacitor and based on a capacitor voltage level exceeding a capacitor voltage rating.

8. A vehicular electric power system comprising;
an alternator producing a plurality of voltage outputs; and
a protection circuit comprising:
a first capacitor connected between a first connection point and a second connection point, wherein the first connection point is associated with a first voltage level output of the alternator and the second connection point is associated with a second voltage level output of the alternator, wherein the first voltage level is different than the second voltage level;
a second capacitor connected between the second connection point and a third connection point, wherein the third connection point is associated with a third voltage level;
a first switch; and
a controller circuit configured to activate the first switch to disconnect one or both of the first capacitor and the second capacitor based on a ratio between the first voltage level and the second voltage level point being greater than a predefined ratio.

9. The vehicular electric power system of claim 8, wherein the third voltage level corresponds to electrical ground.

10. The vehicular electric power system of claim 8, wherein the controller is further configured to disconnect one or both of the first capacitor and the second capacitor based on a current level associated with one of the first capacitor or the second capacitor.

11. The vehicular electric power system of claim 8, wherein the controller is further configured to disconnect one or both of the first capacitor and the second capacitor based on a comparison of a first capacitor temperature of the first capacitor to a first capacitor temperature rating or a second capacitor temperature of the second capacitor to a second capacitor temperature rating.

12. The vehicular electric power system of claim 8, wherein the controller comprises an analog circuit.

13. The vehicular electric power system of claim 8, wherein the controller comprises a microcontroller.

14. The vehicular electric power system of claim 13, further comprising a communication interface, wherein the controller receives a command via the communication interface from an external device to disconnect one or both of the first capacitor and the second capacitor.

15. The vehicular electric power system of claim 14, further comprising an external controller generating the command based on input received from the controller via the communication interface.

16. The vehicular electric power system of claim 13, wherein the microcontroller processes instructions that cause the controller to manipulate at least one switch based on a voltage differential, wherein the voltage differential comprises a capacitor voltage level exceeding a capacitor voltage rating.

17. The vehicular electric power system of claim 13, wherein the microcontroller processes instructions that cause the controller to manipulate at least one switch based on a sensed current meeting a threshold.

18. The vehicular electric power system of claim 13, wherein the microcontroller processes instructions that cause the controller to manipulate at least one switch based on a sensed temperature of a capacitor meeting a threshold.

19. The vehicular electric power system of claim 14, wherein the microcontroller exchanges information corresponding to the protection circuit with an external computing device.

20. The vehicular electric power system of claim 14, wherein the microcontroller processes instructions that cause the controller to manipulate at least one switch based on a determination that normal operation has resumed.

* * * * *